United States Patent
McGee et al.

(10) Patent No.: US 7,079,942 B2
(45) Date of Patent: Jul. 18, 2006

(54) METHOD FOR CONTROLLING STARTING OF AN ENGINE IN A HYBRID ELECTRIC VEHICLE POWERTRAIN

(75) Inventors: Ryan McGee, Ann Arbor, MI (US); Paul Niessen, Plymouth, MI (US); Fazal Syed, Canton, MI (US); John Czubay, Troy, MI (US); Jonathan Butcher, Dearborn, MI (US); Ming Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/292,980

(22) Filed: Dec. 2, 2005

(65) Prior Publication Data

US 2006/0085120 A1 Apr. 20, 2006

Related U.S. Application Data

(62) Division of application No. 10/709,537, filed on May 12, 2004, now Pat. No. 7,013,213.

(51) Int. Cl.
*G06G 7/70* (2006.01)

(52) U.S. Cl. .............. 701/113; 123/179.3; 123/179.4; 180/65.2

(58) Field of Classification Search ................ 701/113, 701/111; 180/65.2; 123/179.3, 179.4
See application file for complete search history.

(56) References Cited

U.S. PATENT DOCUMENTS

| 4,510,396 | A | 4/1985 | Uchida et al. |
|---|---|---|---|
| 6,018,199 | A | 5/2000 | Shiroyama et al. |
| 6,367,570 | B1 | 4/2002 | Long et al. |
| 6,396,165 | B1 | 5/2002 | Nagano et al. |

*Primary Examiner*—Willis R. Wolfe
*Assistant Examiner*—Johnny H. Hoang
(74) *Attorney, Agent, or Firm*—David B. Kelley; Brooks & Kushman

(57) ABSTRACT

A method for controlling starting of an internal combustion engine in a hybrid electric vehicle powertrain having multiple power flow paths to vehicle traction wheels from the engine and from an electric motor. A smoothness factor is calculated to determine how smooth an engine start should be. Engine operating variables regulate engine smoothness during engine start events as determined by the calculated smoothness factor appropriate for selected vehicle operating conditions.

30 Claims, 5 Drawing Sheets

METHOD FOR CONTROLLING STARTING OF AN ENGINE IN A HYBRID ELECTRIC VEHICLE POWERTRAIN

CROSS-REFERENCE TO RELATED APPLICATIONS

This application is a division of U.S. application Ser. No. 10/709,537 filed May 12, 2004 now U.S. Pat. No. 7,013,213. The application claims the benefit of that application.

BACKGROUND OF THE INVENTION

1. Field of the Invention

The invention relates to hybrid electric vehicle powertrains having an internal combustion engine and an electric motor that cooperate to provide a first power delivery mode with electromechanical power flow paths and a second power delivery mode in which the motor provides driving power independently of the engine.

2. Background Art

One class of hybrid electric automotive vehicles includes parallel-series hybrid electric vehicles. Such vehicles include a powertrain for delivering power to traction wheels from two power sources through gearing. In one powertrain configuration of this type, a combination of an internal combustion engine and a subsystem consisting of an electric motor and a generator uses a planetary gearset to define in part separate torque delivery paths to the traction wheels. The subsystem comprising the generator and the motor includes a battery, which acts as an energy storage medium.

When the engine, the motor and the generator are functioning in a first driving mode, the engine propels the vehicle in a forward direction using reaction torque from the generator. The planetary gearset in this configuration makes it possible for the engine speed to be effectively decoupled from the vehicle speed through a generator speed control. As a result, engine output power is divided between a mechanical power flow path and an electrical power flow path. The mechanical power flow path extends from the engine to a planetary carrier, to a planetary ring gear, to transmission countershaft gears and, finally, to traction wheels. The electrical power flow path extends from the engine to the planetary carrier, to a planetary sun gear, and to a generator, the generator being electrically coupled to the motor. The motor drives the transmission countershaft gears and the traction wheels. Because of the decoupling of the engine speed from the vehicle speed and the electrical and mechanical power flow paths, such parallel-series hybrid electric vehicle powertrains emulate the characteristics of a continuously variable transmission during a first driving mode.

In a second driving mode, the engine is inactive and the motor, generator and battery subsystem acts as a power source. The electric motor then draws power from the battery and provides propulsion independently of the engine at the traction wheels in both forward and reverse directions.

The electric motor can provide braking torque to capture vehicle kinetic energy during braking, which otherwise would be lost in the form of heat. This charges the battery as the motor acts as a generator. Furthermore, the generator, using battery power, can drive against a one-way clutch on the engine power output shaft to propel the vehicle in a forward direction. In this driving mode, the generator acts as a motor.

When the generator acts as a generator, the vehicle can be propelled in a forward direction to meet a driver's demand for power and to achieve improved acceleration performance.

In a powertrain with conventional continuously variable transmission characteristics it possible to achieve better fuel economy and exhaust gas emission quality by operating the engine at or near the most efficient operating region of its engine speed and torque relationship. It is possible with a parallel-series hybrid electric configuration, however, to potentially improve fuel economy and emission quality even further compared to conventional continuously variable transmission vehicles. This is because the engine size can be reduced while retaining similar vehicle performance due to the presence of dual power sources. Also, overall engine operation can be better optimized since the engine can be stopped if the engine operating conditions are not favorable for high fuel economy operation or if the engine is not in a high emission quality control region. Furthermore, kinetic energy during braking can be captured and stored in the battery through regenerative braking.

Improved fuel economy and emissions control using a parallel-series hybrid electric powertrain configuration is achieved, however, at the expense of system complexity because of the dual power sources. Further, weight and cost may be design penalties. To offset these considerations, the dual power sources can be integrated to work together seamlessly to achieve the goal of better fuel economy and emissions control.

One of the measures that can be taken to coordinate control of the two power sources to achieve better fuel economy and exhaust gas emission quality in a hybrid electric vehicle is to shut off the engine when the engine cannot be operated in a desired efficient operating region; for example, when the vehicle is stopped at traffic lights. This is unlike the function of a conventional engine powertrain where the engine must be started during the first startup of the vehicle and shut off only by turning the ignition key to its off position. In contrast, the engine in a parallel-series hybrid electric vehicle powertrain can be started and stopped repeatedly during normal city driving.

These engine start and stop events can be unexpected to the driver under certain circumstances. They are required, therefore, to be smooth or imperceptible to the driver.

SUMMARY OF THE INVENTION

The invention includes a powertrain for a hybrid electric vehicle with a capability of starting and stopping the internal combustion engine during normal driving. The invention includes a strategy that determines an engine start smoothness factor. This is used in a control routine as a measure of how smooth an engine start should be. Using this smoothness factor, the action taken by the engine and the transmission controls will regulate smoothness. The invention allows the system to be calibrated to meet driver requirements by determining a smoothness factor that can be adjusted for different vehicles while using the same subsystem elements.

The method and strategy of the invention integrates and arbitrates in real time all driving conditions that warrant an engine start and then determines an engine start smoothness factor. The smoothness factor will dictate the control of engine operating variables, such as an engine speed command profile, an engine throttle position, fuel injection "on time" and a spark angle to achieve the desired characteristic of an engine start event; i.e., a smooth, fast or moderate engine start. Another engine operating variable could be engine valve timing. The system architecture allows the control system to be easily implemented and calibrated to meet driver requirements for any hybrid electric vehicle.

BRIEF DESCRIPTION OF THE DRAWINGS

FIG. 5b is a time plot of vehicle acceleration, measured as seat track acceleration, during an engine start up phase, as illustrated in FIG. 5a.

DETAILED DESCRIPTION OF THE PREFERRED EMBODIMENT(S)

Figure 1:
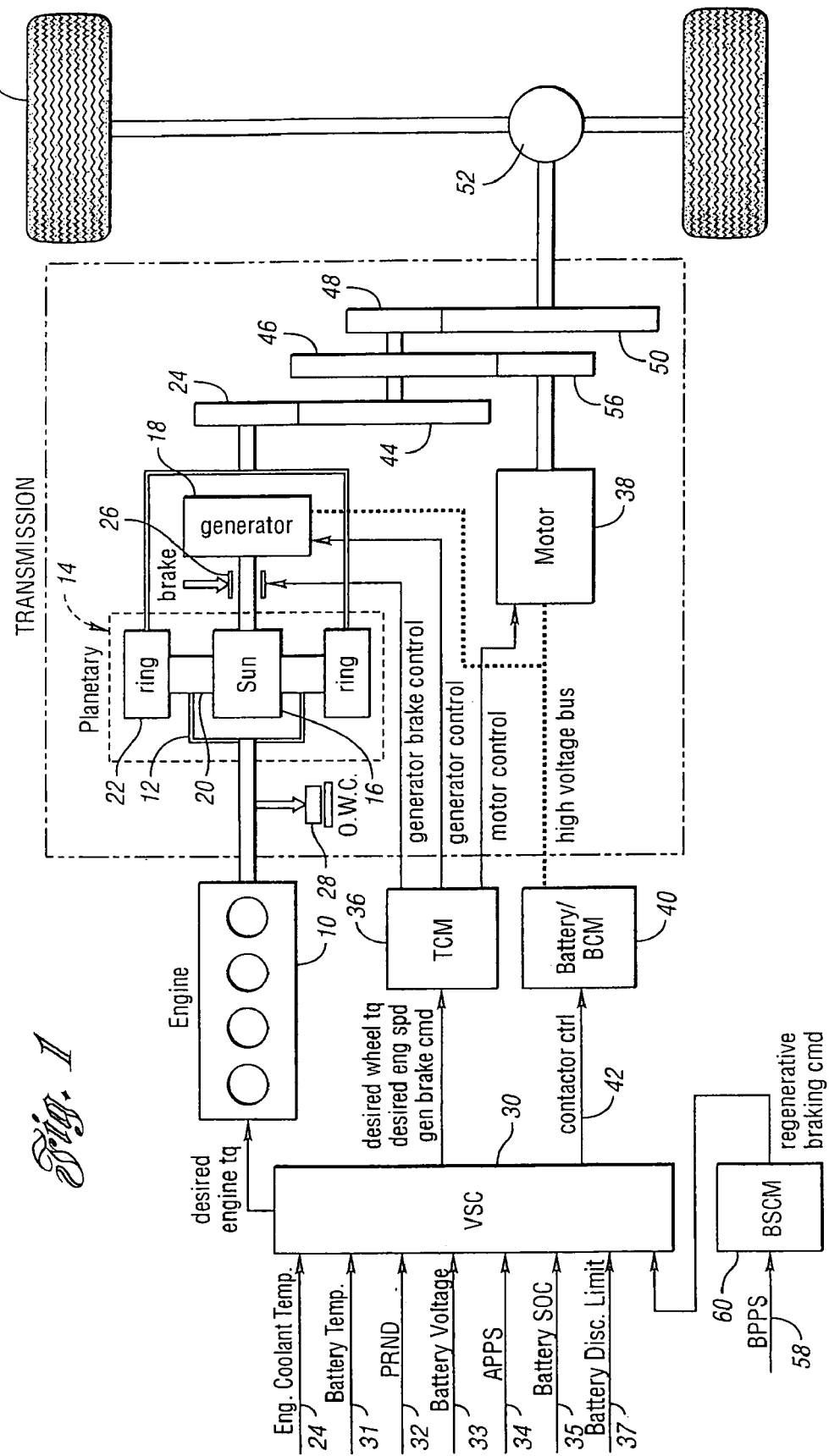
FIG. 1 is a schematic drawing of a hybrid electric vehicle powertrain configuration capable of embodying the invention.

In the hybrid powertrain configuration schematically illustrated in FIG. 1, a torque output crankshaft of internal combustion engine 10 is connected drivably to carrier 12 of planetary gear unit 14. Sun gear 16 of the gear unit 14 acts as a reaction element and is drivably connected to generator 18. Carrier 12 rotatably supports planet pinions 20, which engage sun gear 16 and ring gear 22, the latter being connected drivably to transmission torque input gear 24. The generator 18 provides reaction torque when the engine delivers driving power to the transmission. The generator, which is part of a motor-generator-battery electrical subsystem, develops electrical power to complement mechanical engine power. A reaction brake 26 can be applied to establish a reaction point for the sun gear 16 and to deactivate the generator 18.

When the generator acts as a motor and the engine is deactivated, the crankshaft for the engine is braked by an overrunning coupling 28. Overrunning coupling 28 could be eliminated if sufficient reaction torque can be accommodated by the engine crankshaft when the engine is shut off.

The main controller for the powertrain is a vehicle system controller, generally shown at 30 in FIG. 1. It receives a driver-selected signal at 32 indicating whether the transmission is conditioned for park, reverse, neutral or drive mode. A battery temperature signal is distributed to controller 30 as shown at 31. An accelerator pedal position sensor delivers a signal at 34 to the vehicle system controller 30. This is an indicator of driver power demand. The controller 30 also receives an engine coolant temperature signal 29, a battery voltage signal 33, a battery state of charge signal 35, and a battery discharge limit signal 37.

The desired wheel torque command, the desired engine speed command and the generator brake command are developed by the vehicle system controller and distributed to the transmission control module 36 for controlling the transmission generator brake, the generator control and the motor control. Electric power is distributed to an electric motor 38, which may be a high torque induction motor, although other electric motors could be used in carrying out the control functions of the invention.

The electrical power subsystem, of which the generator 18 and the motor 38 are a part, includes also battery and battery control module 40, which is under the control of the vehicle system controller 30, the latter developing a command at 42 for a battery control module contactor, which conditions the battery for charging or for power delivery. The battery, the motor and the generator are electrically connected by a high voltage bus as indicated.

The transmission includes countershaft gearing having gear elements 44, 46 and 48. Gear element 48 is connected to torque output gear 50, which delivers power to differential 52 and to traction wheels 54. The motor armature is connected to motor drive gear 56, which drivably engages gear element 46.

Application of the vehicle brakes develops a brake pedal position sensor signal 58, which is delivered to the brake system control module 60 for initiating a regenerative braking command by the vehicle system controller.

A hybrid vehicle powertrain, such as that illustrated in FIG. 1, makes use of a combination of the engine and generator using the planetary gear unit 14 to connect them to each other. In one driving mode, the electric drive system, including the motor, the generator and the battery, can be used independently of the engine. The battery then acts as an energy storing unit. When the engine is operative, the vehicle is propelled in a forward direction as reaction torque for the planetary gear unit is accommodated by the generator or by the reaction brake 26.

The planetary gear unit 14 effectively decouples the engine speed from the vehicle speed using a generator command from module 36. Engine power output then is divided into two power flow paths, one being a mechanical path from the carrier 12 to the ring gear 22 and finally to the transmission input gear 24. Simultaneously, an electrical power flow path is established from the carrier 12 to the sun gear 16 to the generator, which is coupled electrically to the motor. Motor torque drives output gear 56. This speed decoupling and the combined electrical and mechanical power flow paths make this transmission function with characteristics similar to a conventional continuously variable transmission.

When the electrical power flow path is effective with the engine inactive, the electric motor draws power from the battery and provides propulsion independently of the engine in both forward and reverse directions. Further, the electric motor can provide braking torque as the motor acts as a generator. This captures the vehicle kinetic energy during braking, which otherwise would be lost to heat, thereby charging the battery. The generator, furthermore, using battery power, can drive against one-way clutch 28 (or a reaction torque developed by the engine crankshaft) to propel the vehicle in a forward direction as the generator acts as a motor. Both the engine and the motor-generator-battery subsystem, as mentioned previously, can be used simultaneously to propel the vehicle in a forward-direction to meet the driver's power demand and to achieve better acceleration performance.

As in the case of conventional continuously variable transmission vehicles, fuel economy and emission quality are improved by operating the engine at or near its most efficient region whenever possible. As previously explained, fuel economy potentially can be improved, as well as the emission quality, because the engine size can be reduced while maintaining the same vehicle performance due to the fact that there are two power sources. The engine can be stopped (turned off) and the motor can be used as the sole power source if the required engine operating conditions for the engine~are not favorable for fuel economy and emissions quality purposes.

In the case of the configuration shown in FIG. 1, the two power sources work together seamlessly to achieve the goal of achieving better fuel economy and emission quality. The vehicle system controller coordinates the vehicle control between the two power sources. The vehicle system controller carries out hierarchical functions as it coordinates vehicle control under various powertrain operating conditions. Assuming there are no subsystem component malfunctions, the vehicle system controller interprets driver demands, such as the drive range selection at 32 and acceleration or deceleration demand at 34, and then determines a wheel torque command based on the driver demand and the powertrain limits. In addition, the vehicle system controller determines how much torque each power source needs to provide, and when it needs it, in order to meet driver demand and to achieve a specified vehicle performance, a desired fuel economy and a desired emission quality level. The vehicle system controller thus determines when the engine needs to be turned off and on. It also determines the engine operating point (i.e., the engine speed and torque) for a given engine power demand when the engine is on.

If the vehicle is stopped at a traffic light, for example, the engine will be stopped. The engine must be started and stopped several times during normal city driving. Since the engine starting and stopping events can occur unexpectedly to the driver, unlike initial start-up of the vehicle using the ignition key switch, a start-up event for the engine during normal city driving should be imperceptible.

Figure 3A:
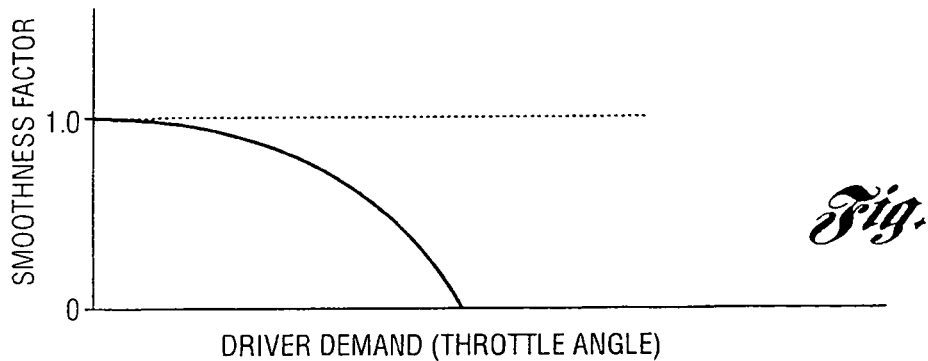
FIG. 3a is a plot showing the relationship of driver demand for power and smoothness factor.
Figure 3B:
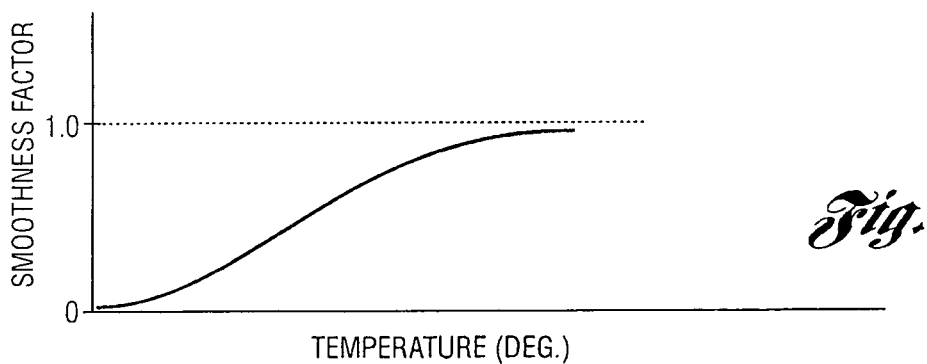
FIG. 3b is a plot showing the relationship between engine temperature and smoothness factor.
Figure 3C:
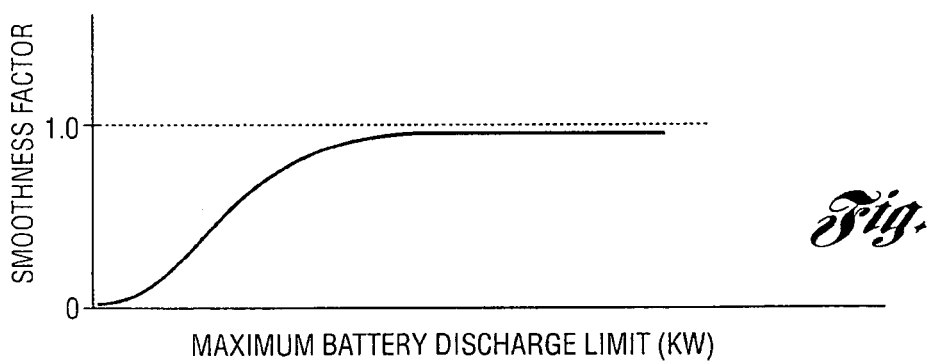
FIG. 3c is a plot showing the relationship between battery discharge limits and smoothness factor.
Figure 3D:
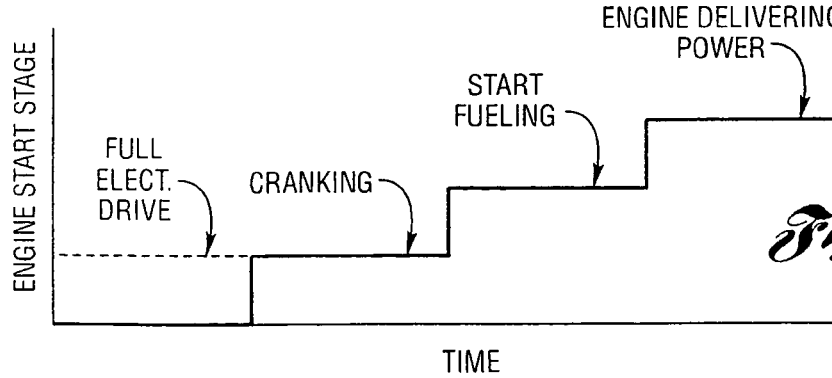
FIG. 3d is a time plot for the various stages of an engine start event.

As shown in FIG. 3d, the engine start-up event can include several stages, which are identified in FIG. 3d as the cranking or engine speed command profiling stage, the start fueling stage and the engine delivery power stage. Transitions from one stage to the other can occur at various times, depending on the driving conditions and other operating variables. Thus, the cranking stage, for example, can be shifted to the left or the right on the time plot of FIG. 3d. The same is true for the start fueling stage and the engine power delivering stage.

Figure 5A:
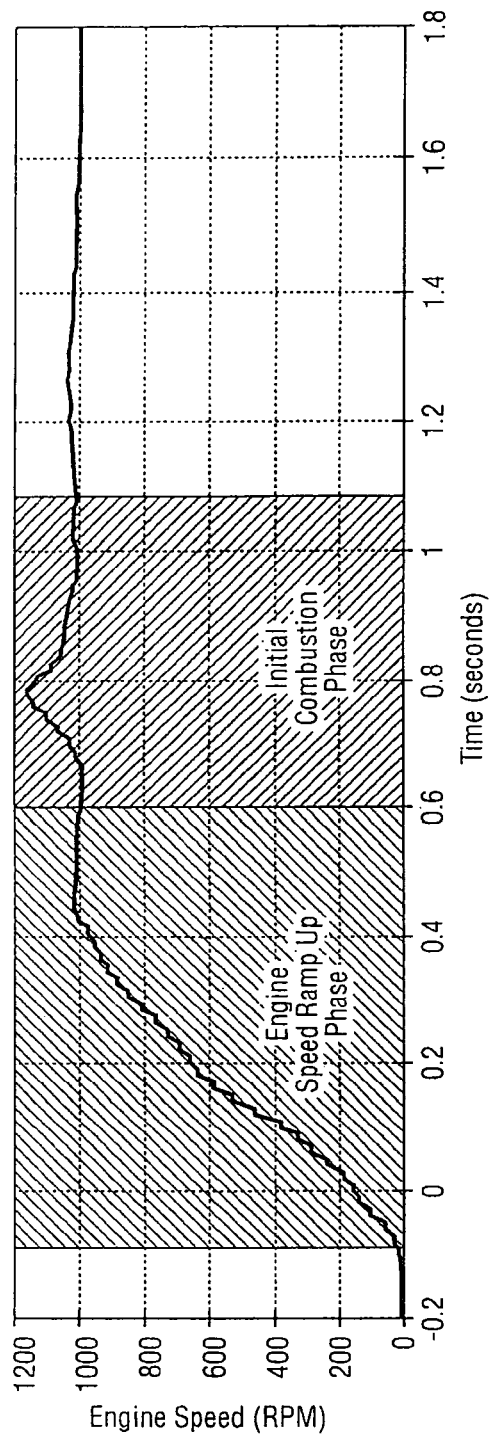
FIG. 5a is a time plot of engine speed at various stages of an engine starting event.

FIG. 5a shows a time plot of the engine speed for each of two phases, or stages, of the engine starting event, the first phase being the engine cranking phase and the second phase being the initial combustion phase (start fueling stage).

Figure 2:
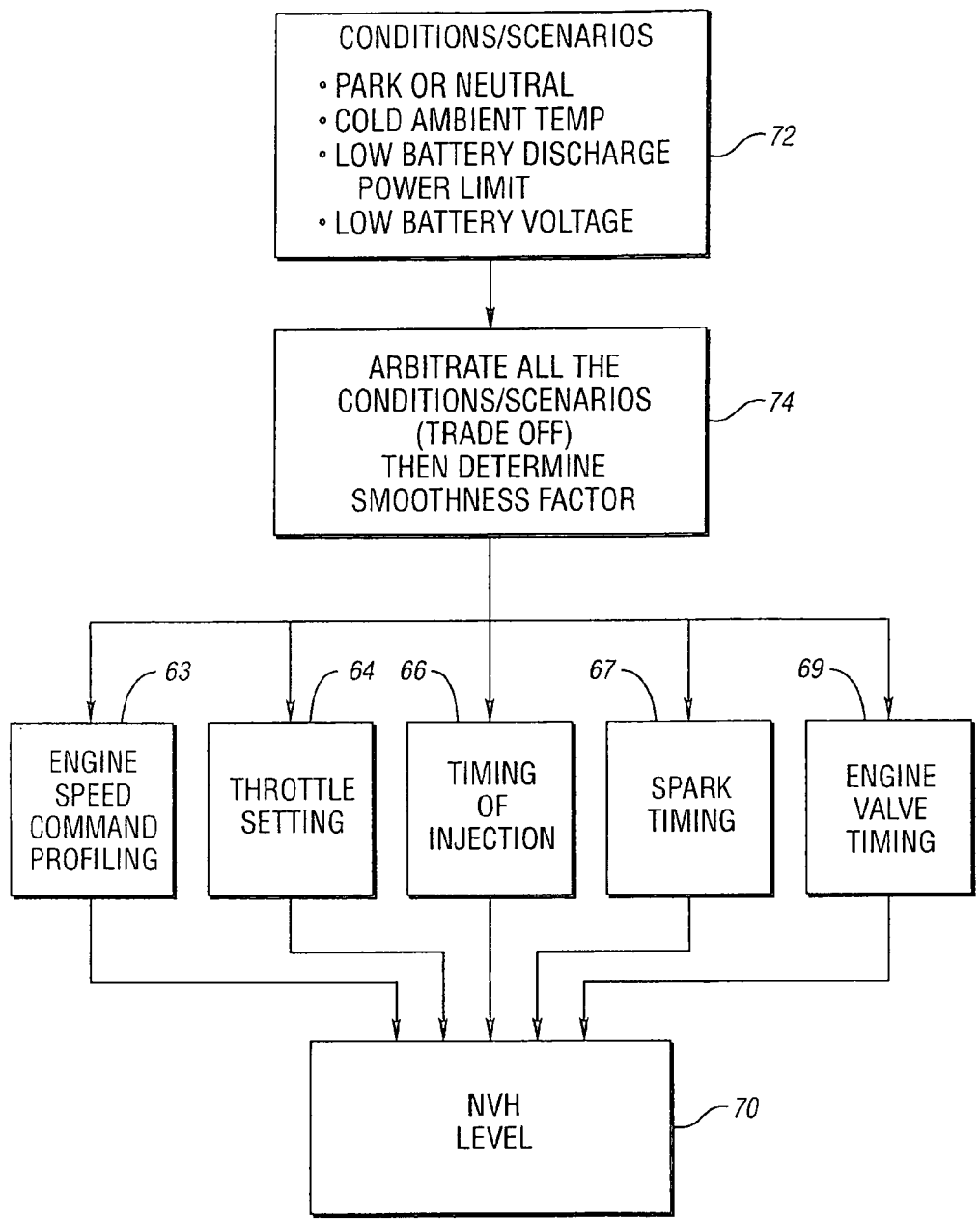
FIG. 2 is a flow chart illustrating the sequence of steps involved in establishing an appropriate smoothness factor as part of the actions taken by the engine and transmission controls to regulate smoothness during an engine start.
Figure 5B:
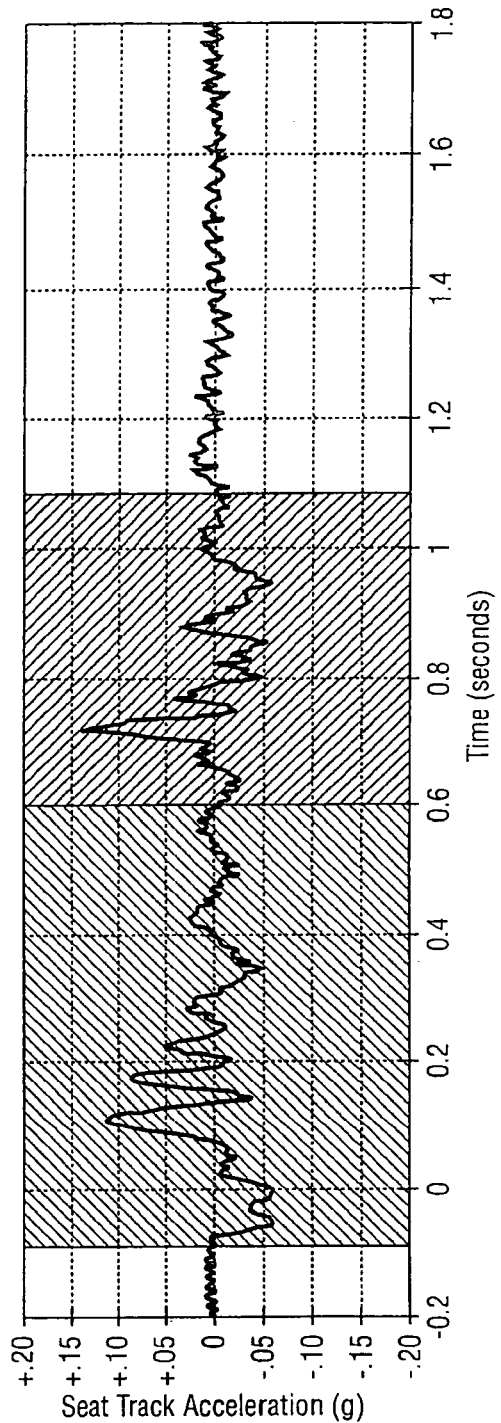

FIG. 5b is a time plot, corresponding to FIG. 5a, which illustrates seat track acceleration for each of the two phases indicated in FIG. 5a. The seat track acceleration is one of the objective measurements for determining engine start smoothness. Preferably, an engine start should not result in any oscillatory seat track acceleration. In reality, however, the engine start will cause undesired vibrations and harshness, as shown by the plot in FIG. 5b. This is because induction air compression in the engine cylinders during the engine cranking stage and in the initial engine combustion phase causes powertrain engine block shaking, which results in vibrations and harshness that can be transmitted to the vehicle body through the powertrain mounts. This vibration and harshness will be objectionable to the driver under certain vehicle operating conditions. Vibration and harshness can be minimized, however, to make any engine start event roughness less apparent to the driver by properly controlling engine speed command profiling, throttle position, time to "turn on" injectors, spark retard, and other variables, such as engine valve timing. These variables are illustrated in FIG. 2. As a result of the control of these variables, the noise vibration and harshness level (NVH) is determined, as indicated at block 70 of FIG. 2.

The proper control that would achieve a reduction in NVH level to an imperceptible value during engine start events will usually prolong the engine start event. This prolonged engine start event would be acceptable to the driver under a park or neutral condition, a low accelerator demand condition or a cruising condition. However, if the driver demands full power to accelerate the vehicle, a prolonged smooth engine start event may not be acceptable. Under such full power demand operating conditions, the driver anticipates that the engine should provide power as quickly as possible, while achieving a desired level of NVH. The engine smoothness during full power demand operation will make engine smoothness less important than a rapidly increasing engine power level. In addition, under cold ambient temperature, or a low battery state-of-charge condition, or a low battery discharge limit condition, the engine must be started as soon as possible because of the system constraints. Engine start smoothness also is less important in these operating scenarios.

As indicated in FIG. 2, the vehicle system controller will determine the condition or operating scenario that exists prior to an engine start. This is indicated at block 72. The control strategy first integrates and arbitrates all of the conditions for engine start and determines from calibrated empirical data a variable related to how smooth the engine start should be. This is referred to in this specification as the engine smoothness factor. Then, based on the determined engine smoothness factor, selected engine controls for engine, such as speed command profiling at 62, throttle position at 64, injection on-time at 66, and spark angle (timing) at 68 are applied to the engine to meet the driver's expectations for power level and NVH. Another control can be engine valve timing at 69. This arbitration of all the conditions or scenarios are determined as shown at block 74 in FIG. 2.

The integration and arbitration of the conditions or scenarios at 74 determine the effective condition or scenario that should exist during an engine start, and then the engine start smoothness factor is calculated. The smoothness factor will dictate the engine speed command profile, the throttle position, the fuel injection "on-time," and the spark angle, as well as valve timing if engine valve timing is available. That is, it determines whether the event should be smooth, fast or in between. Although this architecture and the method and strategy for determining smoothness factor is illustrated in connection with the configuration illustrated in FIG. 1, they can be used with any of a variety of hybrid electric vehicles using independent engine power and motor power.

FIG. 3a shows the relationship between throttle angle and smoothness factor associated with throttle angle changes. FIG. 3b shows the effect of engine temperature on engine smoothness factor during an engine start event. FIG. 3c shows the relationship of engine smoothness factor to maximum battery discharge limit.

Figure 4:
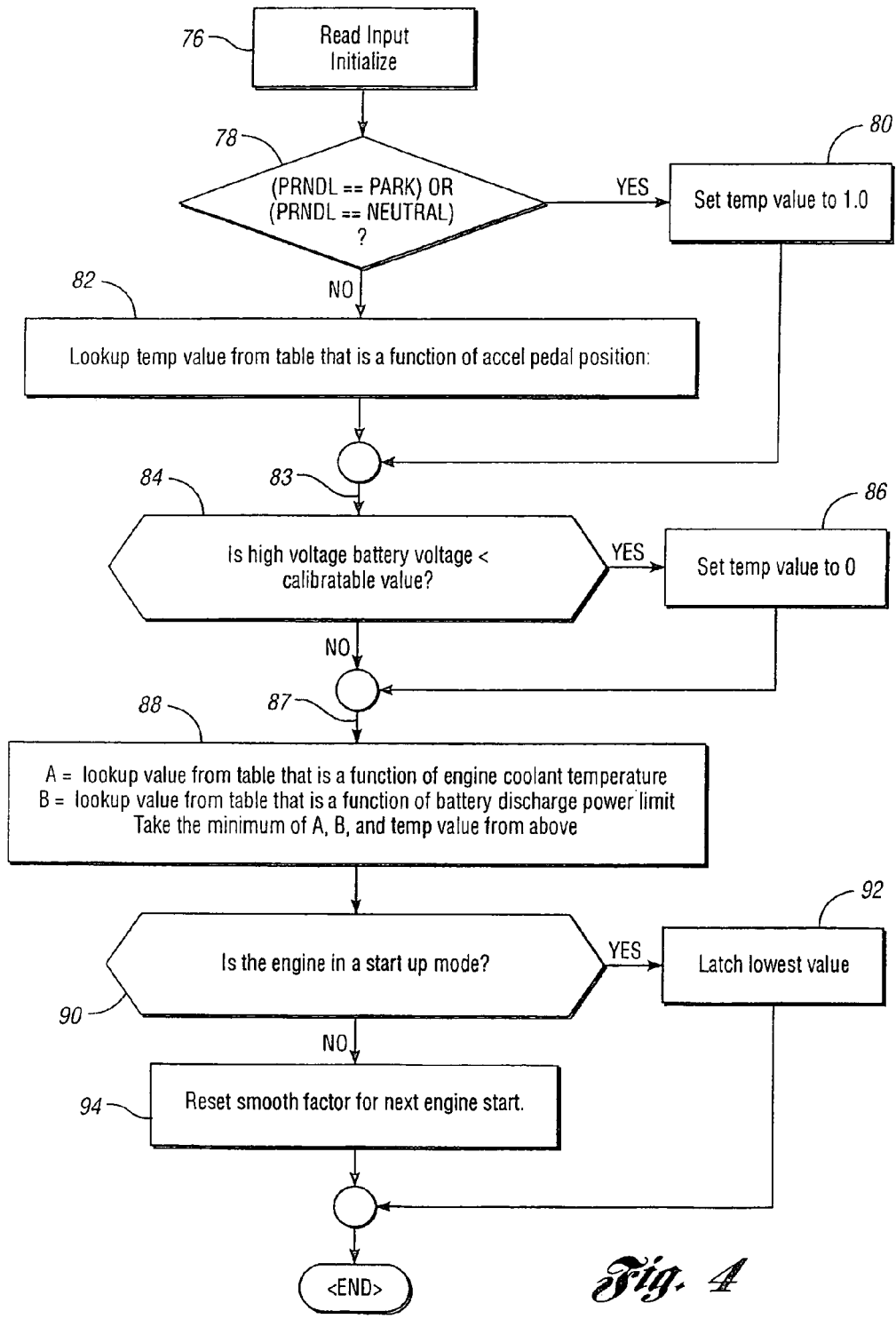
FIG. 4 is a flow chart showing the steps involved in an engine smoothness factor calculation that is carried out following an arbitration routine for the engine operating conditions illustrated in the flow chart of FIG. 2.

FIG. 4 shows a flow chart illustrating the method and strategy for establishing engine smoothness factor as a percentage value from 0 to 1, where 0 indicates least smooth and the value of 1 indicates most smooth.

The routine is initialized at 76 and the input variables are read. If the range selector is set to park or at neutral, as determined at 78, a temporary value for the smoothness factor is set to 1, as shown at block 80. This is indicated as a temporary smoothness factor at 83. The reason the smoothness factor is set to 1 in this condition is that there is no need for a fast engine start when the vehicle is in park or neutral. If an engine start occurs in park or neutral, it should always be a smooth start.

If the vehicle is not in park or neutral, the routine will proceed to block 82, where there is determined from a two-dimensional, calibratable table stored in memory, a smoothness factor that is a function of accelerator pedal position. This is done to capture the driver's demand for power at the wheels. If the accelerator position if firmly pressed, that means the driver wishes high power at the wheels. Therefore, the engine should start quickly and NVH can be traded-off to accommodate a short engine start time. The stage of an engine start illustrated in FIG. 3d then is shifted to the left in the time plot.

At decision block 84, it is determined whether the battery voltage is less than a calibratable value. This value can be determined from a stored table as a function of battery temperature and SOC, or either of these variables. If the traction battery voltage falls below a calibratable value, then the smoothness factor should be latched to 0, as shown at block 86 and indicated as a temporary smoothness factor at 87, until the engine start has been completed. The reason for this is that if the traction battery voltage is very low, it is important to start the engine as soon as possible. A smooth engine start then should be sacrificed to protect the traction battery.

If the traction battery voltage is above a calibratable value, the routine proceeds to block 88 where a temporary smoothness factor is obtained from a two-dimensional, calibratable table in memory. The temporary smoothness factor in that table is a function of engine coolant temperature. The rationale for this is that if the engine coolant temperature is low, that will cause engine friction to be high. This operating condition will increase the amount of battery power required to start the engine. At extremely low engine coolant temperatures, it is difficult to start the engine and smoothness should be reduced to ensure that the engine is started properly.

At action block 88, a temporary smoothness factor is determined also from a two-dimensional, calibratable table that is a function of maximum battery discharge power limit. The rationale for this is that a smooth engine start requires more battery power than a fast engine start. Therefore, the smoothness factor should be a function of the maximum allowable discharge battery power.

At action block 88, the least of the smoothness factor value determined as a function of engine coolant temperature, the smoothness factor value determined as a function of battery discharge power limit and the temporary smoothness factor value at 87 is chosen.

It is determined at decision block 90 whether the engine is in a start-up mode. The engine smoothness factor can only decrease during an engine start, so the lowest value chosen at action block 88 is latched, as shown at 92. If the engine is in a start-up mode, this will increase the stability of the control system.

Alternatively, decision block 84 and block 86 are replaced by a block where there is determined from a two-dimensional, calibratable table stored in memory, a voltage smoothness factor that is a function of voltage, and where the temporary smoothness factor value selected at 87 corresponds to the lesser of the temporary smoothness factor at 83 and the voltage smoothness factor.

The routine then resets the smoothness factor, as shown at block 94, for the next engine start after the current start has been completed.

Although one embodiment of the invention has been disclosed, it will be apparent to persons skilled in the art that modifications may be made without departing from the scope of the invention. All such modifications and equivalents thereof are intended to be covered by the following claims.

What is claimed:

1. A method for determining an engine smoothness factor in an engine start event for an accelerator-controlled engine in a vehicle having a hybrid powertrain that includes an electric motor, a battery, a generator and transmission torque delivery elements that define, in part, integrated power flow paths to vehicle traction wheels whereby the engine may be turned off during power delivery from the motor, the method comprising the steps of:

determining whether the vehicle is in a park mode or a neutral mode and initializing the method by determining a temporary smoothness factor depending on park or neutral selection and setting it to a value corresponding to maximum smoothness if the vehicle is in a park mode or a neutral mode;

measuring accelerator position and determining a temporary smoothness factor as a function of accelerator position;

measuring battery voltage and determining a temporary smoothness factor as a function of battery voltage;

measuring engine coolant temperature and determining a temporary smoothness factor as a function of engine coolant temperature;

measuring battery discharge power limit and determining a temporary smoothness factor as a function of the battery discharge power limit; and selecting the determined temporary smoothness factor with a value corresponding to least smoothness when the engine is in a start-up mode.

2. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

determining whether the vehicle is in a park mode or a neutral mode and initializing the method by determining a temporary smoothness factor depending on park or neutral selection and setting it to a value corresponding to maximum smoothness if the vehicle is in a park mode or a neutral mode;

measuring accelerator position and determining a temporary smoothness factor as a function of accelerator position;

measuring battery voltage and determining a temporary smoothness factor as a function of battery voltage;

measuring engine coolant temperature and determining a temporary smoothness factor as a function of engine coolant temperature;

measuring battery discharge power limit and determining a temporary smoothness factor as a function of the battery discharge power limit;

selecting the determined temporary smoothness factor with a value corresponding to least smoothness when the engine is in a start-up mode; and adjusting engine start smoothness using at least one engine operating variable selected from multiple engine operating variables, selection of the at least one engine operating variable being determined by a calibrated relationship of the selected temporary smoothness factor and each selected engine operating variable.

3. The method set forth in claim 2, wherein the multiple engine operating variables include engine speed command profile, engine throttle setting, fuel injection timing, engine spark timing and engine valve timing.

4. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor torque and speed relationship, the method comprising the steps of:

determining whether the vehicle is in a park mode or a neutral mode and initializing the method by determining a temporary smoothness factor depending on park or neutral selection and setting it to a value corresponding to maximum smoothness if the vehicle is in a park mode or a neutral mode;

measuring accelerator position and determining a temporary smoothness factor as a function of accelerator position;

measuring battery voltage and determining a temporary smoothness factor as a function of battery voltage;

determining a temporary smoothness factor as a function of the battery discharge power limit; and selecting the determined temporary smoothness factor with a value corresponding to least smoothness when the engine is in a start-up mode.

5. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

determining whether the vehicle is in a park mode or a neutral mode and initializing the method by determining a temporary smoothness factor depending on park or neutral selection and setting it to a value corresponding to maximum smoothness if the vehicle is in a park mode or a neutral mode;

measuring accelerator position and determining a temporary smoothness factor as a function of accelerator position;

measuring battery voltage and determining a temporary smoothness factor as a function of battery voltage;

determining a temporary smoothness factor as a function of a battery discharge power limit;

selecting the determined temporary smoothness factor with a value corresponding to least smoothness when the engine is in a start-up mode; and adjusting engine start smoothness using at least one engine operating variable selected from multiple engine operating variables, selection of the at least one engine operating variable being determined by a calibrated relationship of the selected temporary smoothness factor and each selected engine operating variable.

6. The method set forth in claim 5, wherein the multiple engine operating variables include engine speed command profile, engine throttle setting, fuel injection timing, engine spark timing, and engine valve timing.

7. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

determining whether the vehicle is in a park mode or a neutral mode and initializing the method by determining a temporary smoothness factor depending on park or neutral selection and setting it to a value corresponding to maximum smoothness if the vehicle is in a park mode or a neutral mode;

measuring-accelerator position and determining a temporary smoothness factor as a function of accelerator position;

measuring engine coolant temperature and determining a temporary smoothness factor as a function of engine coolant temperature;

determining a temporary smoothness factor as a function of a battery discharge power limit; and selecting the determined temporary smoothness factor with a value corresponding to least smoothness when the engine is in a start-up mode.

8. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

determining whether the vehicle is in a park mode or a neutral mode and initializing the method by determining a temporary smoothness factor depending on park or neutral selection and setting it to a value corresponding to maximum smoothness if the vehicle is in a park mode or a neutral mode;

measuring accelerator position and determining a temporary smoothness factor as a function of accelerator position;

measuring engine coolant temperature and determining a temporary smoothness factor as a function of engine coolant temperature;

determining a temporary smoothness factor as a function of a battery discharge power limit;

selecting the determined temporary smoothness factor with a value corresponding to least smoothness when the engine is in a start-up mode; and adjusting engine start smoothness using at least one engine operating variable selected from multiple engine operating variables, selection of the at least one engine operating variable being determined by a calibrated relationship of the selected temporary smoothness factor and each selected engine operating variable.

9. The method set forth in claim 8, wherein the selected engine operating variables include engine speed command profile, engine throttle setting, fuel injection timing, engine spark timing and engine valve timing.

10. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

determining whether the vehicle is in a park mode or a neutral mode and initializing the method by determining a temporary smoothness factor depending on park or neutral selection and setting it to a value corresponding to maximum smoothness if the vehicle is in a park mode or a neutral mode;

measuring accelerator position and determining a temporary smoothness factor as a function of accelerator position;

measuring battery voltage and determining a temporary smoothness factor as a function of battery voltage;

measuring engine coolant temperature and determining a temporary smoothness factor as a function of engine coolant temperature; and selecting the determined temporary smoothness factor with a value corresponding to least smoothness when the engine is in a start-up mode.

11. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

determining whether the vehicle is in a park mode or a neutral mode and initializing the method by determining a temporary smoothness factor depending on park or neutral selection and setting it to a value corresponding to maximum smoothness if the vehicle is in a park mode or a neutral mode;

measuring accelerator position and determining a temporary smoothness factor as a function of accelerator position;

measuring battery voltage and determining a temporary smoothness factor as a function of battery voltage;

measuring engine coolant temperature and determining a temporary smoothness factor as a function of engine coolant temperature;

selecting the determined temporary smoothness factor with a value corresponding to least smoothness when the engine is in a start-up mode; and adjusting engine start smoothness using at least one engine operating variable selected from multiple engine operating variables, selection of the at least one engine operating variable being determined by a calibrated relationship of the selected temporary smoothness factor and each selected engine operating variable.

12. The method set forth in claim 11, wherein the multiple engine operating variables include engine speed command profile, engine throttle setting, fuel injection timing, engine spark timing and engine valve timing.

13. A method for determining an engine smoothness factor in an engine start event for an accelerator-controlled engine in a vehicle having a hybrid powertrain that includes an electric motor, a battery, a generator and transmission torque delivery elements that define, in part, integrated power flow paths to vehicle traction wheels whereby the engine may be turned off during power delivery from the motor, the method comprising the steps of:

determining whether the vehicle is in a park mode or a neutral mode and initializing the method by determining a temporary smoothness factor depending on park or neutral selection and setting it to a value corresponding to maximum smoothness if the vehicle is in a park mode or a neutral mode;

measuring accelerator position and determining a temporary smoothness factor as a function of accelerator position;

measuring battery voltage and determining a smoothness factor as a function of battery voltage;

determining battery discharge power limit and determining a temporary smoothness factor as a function of the battery discharge power limit; and selecting the determined temporary smoothness factor with a value corresponding to least smoothness and when the engine is in a start-up mode.

14. A-method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

determining whether the vehicle is in a park mode or a neutral mode and initializing the method by determining a temporary smoothness factor depending on park or neutral selection and setting it to a value corresponding to maximum smoothness if the vehicle is in a park mode or a neutral mode;

measuring accelerator position and determining a temporary smoothness factor as a function of accelerator position;

measuring battery voltage and determining a smoothness factor as a function of battery voltage;

determining battery discharge power limit and determining a temporary smoothness factor as a function of the battery discharge power limit;

selecting the determined temporary smoothness factor with a value corresponding to least smoothness when the engine is in a start-up mode; and adjusting engine start smoothness using at least one engine operating variable selected from multiple engine operating variables, selection of the at least one engine operating variable being determined by a calibrated relationship of the selected temporary smoothness factor and each selected engine operating variable.

15. A method for determining an engine smoothness factor in an engine start event for an accelerator-controlled engine in a vehicle having a hybrid powertrain that includes an electric motor, a battery, a generator and transmission torque delivery elements that define, in part, integrated power flow paths to vehicle traction wheels whereby the engine may be turned off during power delivery from the motor, the method comprising the steps of:

measuring accelerator position and determining a temporary smoothness factor as a function of accelerator position;

measuring battery voltage and determining a temporary smoothness factor as a function of battery voltage;

measuring engine coolant temperature and determining a temporary smoothness factor as a function of engine coolant temperature;

measuring battery discharge power limit and determining a temporary smoothness factor as a function of the battery discharge power limit; and selecting the determined temporary smoothness factor with a value corresponding to least smoothness when the engine is in a start-up mode.

16. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

measuring accelerator position and determining a temporary smoothness factor as a function of accelerator position;

measuring battery voltage and determining a temporary smoothness factor as a function of battery voltage;

measuring engine coolant temperature and determining a temporary smoothness factor as a function of engine coolant temperature;

measuring battery discharge power limit and determining a temporary smoothness factor as a function of the battery discharge power limit;

selecting the determined temporary smoothness factor with a value corresponding to least smoothness when the engine is in a start-up mode; and adjusting engine start smoothness using at least one engine operating variable selected from multiple engine operating variables, selection of the at least one engine operating variable being determined by a calibrated relationship of the selected temporary smoothness factor and each selected engine operating variable.

17. The method set forth in claim 16, wherein the multiple engine operating variables include engine speed command profile, engine throttle setting, fuel injection timing, engine spark timing and engine valve timing.

18. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor torque and speed relationship, the method comprising the steps of:

measuring accelerator position and determining a temporary smoothness factor as a function of accelerator position;

measuring battery voltage and determining a temporary smoothness factor as a function of battery voltage;

determining a temporary smoothness factor as a function of the battery discharge power limit; and selecting the determined temporary smoothness factor with a value corresponding to least smoothness when the engine is in a start-up mode.

19. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

measuring accelerator position and determining a temporary smoothness factor as a function of accelerator position;

measuring battery voltage and determining a temporary smoothness factor as a function of battery voltage;

determining a temporary smoothness factor as a function of a battery discharge power limit;

selecting the determined temporary smoothness factor with a value corresponding to least smoothness when the engine is in a start-up mode; and adjusting engine start smoothness using at least one engine operating variable selected from multiple engine operating variables, selection of the at least one engine operating variable being determined by a calibrated relationship of the selected temporary smoothness factor and each selected engine operating variable.

20. The method set forth in claim 19, wherein the multiple engine operating variables include engine speed command profile, engine throttle setting, fuel injection timing, engine spark timing, and engine valve timing.

21. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

measuring accelerator position and determining a temporary smoothness factor as a function of accelerator position;

measuring engine coolant temperature and determining a temporary smoothness factor as a function of engine coolant temperature;

determining a temporary smoothness factor as a function of a battery discharge power limit; and selecting the determined temporary smoothness factor with a value corresponding to least smoothness when the engine is in a start-up mode.

22. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

measuring accelerator position and determining a temporary smoothness factor as a function of accelerator position;

measuring engine coolant temperature and determining a temporary smoothness factor as a function of engine coolant temperature;

determining a temporary smoothness factor as a function of a battery discharge power limit;

selecting the determined temporary smoothness factor with a value corresponding to least smoothness when the engine is in a start-up mode; and adjusting engine start smoothness using at least one engine operating variable selected from multiple engine operating variables, selection of the at least one engine operating variable being determined by a calibrated relationship of the selected temporary smoothness factor and each selected engine operating variable.

23. The method set forth in claim 22, wherein the selected engine operating variables include engine speed command profile, engine throttle setting, fuel injection timing, engine spark timing and engine valve timing.

24. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

measuring accelerator position and determining a temporary smoothness factor as a function of accelerator position;

measuring battery voltage and determining a temporary smoothness factor as a function of battery voltage;

measuring engine coolant temperature and determining a temporary smoothness factor as a function of engine coolant temperature; and selecting the determined temporary smoothness factor with a value corresponding to least smoothness when the engine is in a start-up mode.

25. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

measuring accelerator position and determining a temporary smoothness factor as a function of accelerator position;

measuring battery voltage and determining a temporary smoothness factor as a function of battery voltage;

measuring engine coolant temperature and determining a temporary smoothness factor as a function of engine coolant temperature;

selecting the determined temporary smoothness factor with a value corresponding to least smoothness when the engine is in a start-up mode; and adjusting engine start smoothness using at least one engine operating variable selected from multiple engine operating variables, selection of the at least one engine operating variable being determined by a calibrated relationship of the selected temporary smoothness factor and each selected engine operating variable.

26. The method set forth in claim 25, wherein the multiple engine operating variables include engine speed command profile, engine throttle setting, fuel injection timing, engine spark timing and engine valve timing.

27. A method for determining an engine smoothness factor in an engine start event for an accelerator-controlled engine in a vehicle having a hybrid powertrain that includes an electric motor, a battery, a generator and transmission torque delivery elements that define, in part, integrated power flow paths to vehicle traction wheels whereby the engine may be turned off during power delivery from the motor, the method comprising the steps of:

measuring accelerator position and determining a temporary smoothness factor as a function of accelerator position;

measuring battery voltage and determining a smoothness factor as a function of battery voltage;

determining battery discharge power limit and determining a temporary smoothness factor as a function of the battery discharge power limit; and selecting the determined temporary smoothness factor with a value corresponding to least smoothness and when the engine is in a start-up mode.

28. A method for determining an engine smoothness factor in an engine start event for an accelerator-controlled engine in a vehicle having a hybrid powertrain that includes an electric motor and transmission torque delivery elements that define, in part, integrated power flow paths to vehicle traction wheels whereby the engine may be turned off during power delivery from the motor, the method comprising the steps of:

measuring accelerator position and determining a temporary smoothness factor as a function of accelerator position;

measuring battery voltage and determining a smoothness factor as a function of battery voltage;

determining battery discharge power limit and determining a temporary smoothness factor as a function of the battery discharge power limit;

selecting the determined temporary smoothness factor with a value corresponding to least smoothness when the engine is in a start-up mode; and adjusting engine start smoothness using at least one engine operating variable selected from multiple engine operating variables, selection of the at least one engine operating variable being determined by a calibrated relationship of the selected temporary smoothness factor and each selected engine operating variable.

29. A method for controlling smoothness of an engine start event for a hybrid electric vehicle powertrain having an engine and an electric motor for delivering driving power to vehicle traction wheels, the smoothness of the engine start being related to a smoothness factor, the method comprising the steps of:

determining vehicle operating conditions;

determining a smoothness factor corresponding to each vehicle operating condition whereby smoothness of an engine start is indicated by the smoothness factor; and effecting desired smoothness of an engine start event for at least one given vehicle operating condition by using a calibrated relationship of smoothness factor and the given vehicle operating condition.

30. The method set forth in claim 29, wherein the smoothness factor used in effecting the desired smoothness of an engine start event is the smoothness factor corresponding to the least smoothness of the engine start event.

* * * * *